(12) United States Patent
Bedel et al.

(10) Patent No.: US 8,974,741 B2
(45) Date of Patent: Mar. 10, 2015

(54) DEVICE FOR TREATING GASES USING SURFACE PLASMA

(71) Applicant: Commissariat a l'Energie Atomique et aux Energies Alternatives, Paris (FR)

(72) Inventors: Laurent Bedel, Quaix en Chartreuse (FR); Michel Jouve, Vinay (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/062,181

(22) Filed: Oct. 24, 2013

(65) Prior Publication Data

US 2014/0050631 A1 Feb. 20, 2014

Related U.S. Application Data

(63) Continuation of application No. PCT/FR2012/050644, filed on Mar. 28, 2012.

(30) Foreign Application Priority Data

May 10, 2011 (FR) ...................... 11 53982

(51) Int. Cl.
 *B01J 19/08* (2006.01)
 *B01D 53/32* (2006.01)
 *B01D 53/86* (2006.01)
(52) U.S. Cl.
 CPC ............. *B01J 19/088* (2013.01); *B01D 53/323* (2013.01); *B01D 53/8631* (2013.01); *B01D 53/8668* (2013.01); *B01D 2257/708* (2013.01); *B01D 2259/818* (2013.01); *Y02C 20/10* (2013.01)
 USPC .................................................. 422/186.04

(58) Field of Classification Search
 USPC ...................................................... 422/186.04
 See application file for complete search history.

(56) References Cited

U.S. PATENT DOCUMENTS

| 5,746,984 A | 5/1998 | Hoard |
| 7,380,756 B1 | 6/2008 | Enloe et al. |
| 2002/0070127 A1 | 6/2002 | Song et al. |
| 2005/0118079 A1 | 6/2005 | Muroi et al. |
| 2006/0030481 A1* | 2/2006 | LaBarge et al. ............... 502/324 |
| 2012/0315194 A9 | 12/2012 | Rousseau et al. |

FOREIGN PATENT DOCUMENTS

| EP | 2 133 525 A1 | 12/2009 |
| FR | 2 918 293 | 1/2009 |
| JP | 11-347342 | 12/1999 |
| JP | 2000-140562 | 5/2000 |

OTHER PUBLICATIONS

Bénard, Nicolas, et al., "*Aerodynamic plasma actuators: A directional microjet device*," Thin Solid Films. vol. 516, Issue 19, Aug. 1, 2008, pp. 6660-6667 (Abstract).
International Search Report and Written Opinion mailed Jun. 4, 2012.
International Preliminary Report on Patentability mailed Aug. 20, 2013.

\* cited by examiner

*Primary Examiner* — Kishor Mayekar
(74) *Attorney, Agent, or Firm* — Burr & Brown, PLLC

(57) ABSTRACT

A device for treating gases using surface plasma, including: at least one dielectric substrate having two opposite main surfaces, at least one first electrode, and at least one second electrode being respectively deposited on the two opposite main surfaces of the substrate, the first and second electrodes being connected to the two terminals of an electric power supply source; at least one catalytic support independent from the dielectric substrate and from the electrodes, and integrating a catalyst.

13 Claims, 3 Drawing Sheets

DEVICE FOR TREATING GASES USING SURFACE PLASMA

BACKGROUND OF THE INVENTION

1. Field of the Invention

The invention relates to a device for treating gases by means of a surface plasma, in the presence of a catalyst.

The fields of use of the present invention comprise, in particular, the degradation of pollutants likely to be contained in gases, the reforming, and the upgrading of gases.

2. Description of Related Art

In the field of gas treatment, methods using a plasma may result in being particularly advantageous since they enable elimination of pollutants at ambient temperature for a low energy cost when the elements are present in the gases in minute quantities. They may also lower the temperature of reaction between two gaseous compounds and/or lower the power necessary to carry out a reaction between two compounds. The plasmas may be volume or surface plasmas at atmospheric pressure.

In the case of atmospheric plasmas, the dielectric barrier discharge or DBD technology is generally implemented. This technology comprises applying an A.C. signal between two electrodes, a dielectric substrate being interposed between the two electrodes to avoid the forming of an electric arc (FIG. 1).

In the case of volume DBD plasmas, the space between electrodes is limited to a few millimeters due to the fact that voltage necessary to generate the plasma increases with the inter-electrode space (FIG. 1) and that the thickness of the dielectric substrate is linked to its dielectric strength. The inter-electrode spacing depends, in particular, on the nature of the dielectric substrate and on the applied voltage. The dielectric thickness conventionally is between 3 and 5 mm and the free space for the flowing of gases is of the same order of magnitude, which generates a significant head loss. In such a configuration, and as described in document US 2002/0070127, a catalyst may be introduced in the plasma area by deposition on the surface opposite to the electrode. The electrode itself may also be used as a catalyst in the case where it is made of an electrically-conductive material.

The DBD technology may also be implemented to generate a surface plasma. The plasma is then created in the vicinity of the surface of a dielectric substrate. The two electrodes are arranged on this dielectric substrate, on either side of the main surfaces of the dielectric substrate (FIG. 2).

The plasma area can thus be adjusted according to the inter-electrode space. In this configuration, the distance between dielectric substrates is independent from the discharge parameters. Such surface plasmas create an acceleration of the gas speed near the electrodes, as described in document U.S. Pat. No. 7,380,756. The multiplication of electrodes on the surface enables the creation of jet effects perpendicularly to the surface, as described by Bénard et al. ("*Thin Solid Films*", Vol. 516, pp. 6660-6667, 2008).

Document FR 2918293 provides using such surface plasmas for the degradation of pollutants in a gaseous atmosphere. It describes the use of a photocatalyst ($TiO_2$) arranged in the form of a thin layer in contact with the dielectric substrate in the inter-electrode space, such a catalyst being intended to select the decomposition products. In this case, the catalyst thus cannot be an electric conductor such as a metal, to avoid a strong decrease of the plasma area.

The present invention relates, in particular, to a device enabling association of the generation of a surface plasma with a wide range of catalysts, for the treatment of gases, in particular the degradation of pollutants, the reforming, and the upgrading of gases.

The present invention enables improved conversion of gases, but also decreased head losses, while providing the lowest possible power consumption and the lowest possible temperature.

SUMMARY OF THE INVENTION

The Applicant has developed a gas treatment device where a plasma enables to generate, from the gases present, radicals, ions, and active species from the ambient temperature. This device enables to limit head losses and to promote the interaction with species activated by the surface plasma and a catalytic system.

The catalytic system interacts with the species, in particular the pollutants, to increase the plasma efficiency, and also acts on the selectivity of the reactions.

More specifically, the present invention relates to a device for treating gases by means of a surface plasma, comprising:
at least one dielectric substrate having two opposite main surfaces, at least one first electrode and at least one second electrode being respectively deposited on the two opposite main surfaces of the substrate, the first and second electrodes being connected to the two terminals of an electric power supply source;
at least one catalytic support independent from the dielectric substrate and from the electrodes, and integrating a catalyst.

Term electrode is used to designate an electrode or a plurality of electrodes connected to the same source and thus having the same potential. The electric power supply source advantageously has an A.C. or pulse signal.

"Plurality of electrodes" is advantageously used to designate electrodes placed parallel to one another.

"Independent" here means a physical independence of the catalytic support from the substrate; in other words, the catalytic support is not in contact with the substrate, and thereby, is not in contact with the electrodes either. More specifically, the formed surface plasma does not come into contact with the catalytic support, and thus, the plasma does not risk deteriorating the catalytic support. The surface plasma enables to promote the accelerated sending back, and this, substantially perpendicularly to the substrate surface, of the species contained in the gas flow to be treated.

Generally, the gases treated by means of the device according to the present invention comprise VOCs (Volatile Organic Compounds), $NO_x$ (nitrogen oxides) . . . . The quantities of pollutants may vary from less than 1 ppm to several thousands of ppm according to the application and to the nature of the treated gases.

As already indicated, the configuration of the device according to the present invention enables limiting head losses and reinforcing the contact between the active species created by a surface plasma and the catalytic support or catalyst. Indeed, the presence of a catalyst between two dielectric substrates enables a decrease in the power consumption necessary to treat the gas. The species created by the surface plasma are directed towards the catalytic support, given that these plasmas create an acceleration of the gas speed around the electrodes and jet effects perpendicular to the surface of the dielectric substrate (Cf. Bénard et al.).

It should be noted that the surface plasma is formed around each of the two main surfaces of the dielectric substrate between the first electrode and the second electrode.

Further, the device according to the invention provides a greater versatility than prior art devices, the catalytic support being independent from the dielectric substrate comprising the electrodes. It causes a synergy between the catalyst which is positioned between two dielectric substrates, and generally in porous bodies (foam or honeycomb). The invention thus has the advantage of being able to associate with the plasma a wide range of catalysts (metal, oxide, or mixture) comprised in an electrically-conductive or insulating catalytic support (foam, honeycomb). On the other hand, in this device, the thickness of the catalytic support is not limited, and it should only be lower than the spacing between two dielectric substrates, when present.

Advantageously, the first or second electrodes of the device according to the present invention may have a width advantageously in the range between 1 mm and 10 cm, and more advantageously still between 3 and 5 mm.

In a specific embodiment, each electrode may be formed of a plurality of parallel strips, connected to the same potential, arranged on the dielectric substrate, with the projection of each of the electrodes on a plane parallel to the main plane of the substrate forming an interdigitation. Thus, the surface of the dielectric substrate is advantageously optimized and a plurality of surface plasmas may be generated.

Advantageously, the surface area of the electrodes deposited on the dielectric substrate amounts to between 10 and 90% of the total area of the main surface of the dielectric substrate comprising the electrodes, more advantageously between 30 and 50%.

The electrodes deposited on a main surface of the dielectric substrate may be positioned substantially orthogonally or substantially parallel to the general direction of the flow of the gas to be treated. They are preferably orthogonal.

The inter-electrode spacing, defined by the distance separating the projection of the electrodes on a plane parallel to the main plane of the substrate is in the range between 2 mm and 15 mm, advantageously between 4 and 8 mm.

Further, the ratio between the inter-electrode space such as defined hereabove and the electrode width typically is in the range between zero and 2.

Preferably, the thickness of each of the electrodes is in the range between 1 µm and 2 mm.

Advantageously, the catalytic support may appear in the form of a plate of dense material; of metal or ceramic foam; or of metal or ceramic honeycomb. It is advantageously made of:
ceramic: zirconia, yttria-stabilized zirconia, magnesium oxide, cerium oxide, vanadium oxide, cordierite, $WO_3$, $TiO_2$, ZnO, and mixtures thereof; or of metal: Al, Cu, Ni, Zn, stainless steel, Ti, FeCrAl, and mixtures thereof.

Further, the catalytic support generally has a thickness advantageously in the range between 1 mm and 10 cm, and more advantageously still between 5 mm and 5 cm.

The catalytic support comprises a catalyst advantageously capable of being selected from the group comprising metal oxides, nitrides, metals, and mixtures thereof, more advantageously still the following metals: Pt, Ag, Ru, Rh, Cu, Fe, Cr, Pd, Zn, Mn, Co, Ni, V, Mo, Au, Ir, Ce.

To limit head losses, the dielectric substrate and the catalytic support are advantageously spaced apart by from 5 mm to 10 cm, and more advantageously by from 5 mm to 5 cm.

The dielectric substrate is advantageously made of a material selected from the group comprising silica, glass, and alumina.

In a preferred embodiment, the device according to the present invention may comprise at least two dielectric substrates spaced apart from each other, their spacing being preferably in the range between 10 mm and 15 cm, and more advantageously between 1 and 5 cm. The device comprises at least one catalytic support advantageously positioned between two main surfaces comprising the first electrodes, or between two main surfaces comprising the second electrodes.

In this configuration, the catalytic supports are arranged between the dielectrics so that they at least partially cover by projection the area of the electrodes and of the plasma.

The catalytic support is arranged in front of the surface of the dielectric support having the plasma generated thereon.

In a specific embodiment, the device for treating gases by means of a surface plasma according to the present invention has a cylindrical shape. The dielectric substrate and the catalytic support thus have cylindrical shapes and are coaxial. The dielectric substrate can thus be arranged inside of a catalytic support of cylindrical shape. The same applies for the catalytic support, which can be arranged inside of a dielectric substrate of cylindrical shape.

Generally, the surface plasma may preferably be generated between 900 mbar and 20 bar, more preferably between 900 mbar and 2 bar, and more preferably still at the atmospheric pressure.

The present invention also relates to the use of the device for treating gases by means of a surface plasma such as described hereabove for the degradation of pollutants (VOC, $NO_x$, ...) capable of being contained in gases, but also for the reforming of hydrocarbons, of alcohol, or the upgrading of $CO_2$.

In particular, the present invention has the following advantages:
  the distance between dielectric substrates can be adjusted according to the envisaged application;
  the structure of the catalytic support can be modified according to the envisaged application;
  the nature of the catalyst can be selected according to the envisaged application;
  the distance between the dielectric substrate and the catalytic support can be adjusted according to the envisaged application to limit head losses.

The invention and the resulting advantages will better appear from the following non-limiting drawings and examples, provided as an illustration of the invention.

DETAILED DESCRIPTION OF THE INVENTION

Figure 1:
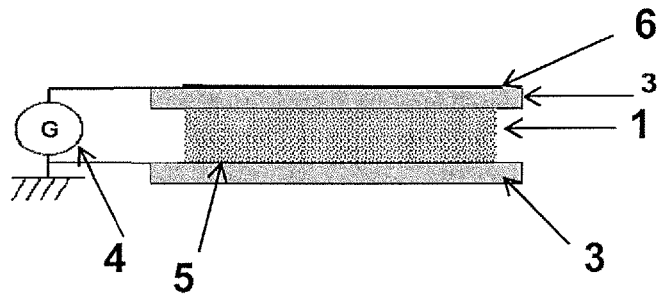
FIG. 1 illustrates the forming of an atmospheric plasma according to prior art between two electrodes deposited on two distinct dielectric substrates, one of the dielectric substrates being interposed between the two electrodes.

As already mentioned, FIG. 1 illustrates the forming of a volume plasma at atmospheric pressure (atmospheric plasma) (1) between two electrodes (5, 6) connected across an electric power supply source (4) according to prior art. The two electrodes are deposited on two dielectric substrates (3) spaced apart from each other. The atmospheric plasma (1) is generated between the two electrodes (5, 6), separated from each other, on the one hand, by one of the dielectric substrates, and on the other hand, by the space separating the dielectric substrates.

Figure 2:
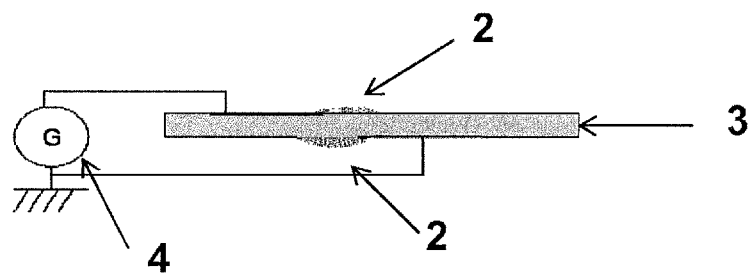
FIG. 2 illustrates the forming of a surface plasma on each surface according to prior art between two electrodes deposited on either side of a same dielectric substrate.

FIG. 2 illustrates the forming of a surface plasma (2) on each surface between two electrodes (5, 6) connected across an electric power supply source (4) according to another prior art configuration. The two electrodes are deposited on two opposite surfaces of a same dielectric substrate (3).

Figure 3:
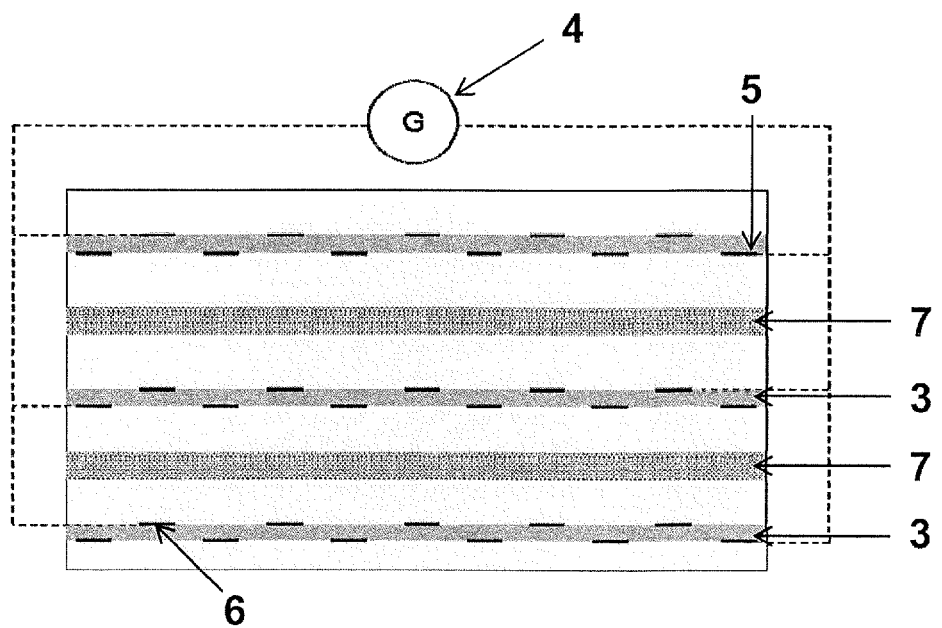
FIG. 3 illustrates a device for treating gases by means of a surface plasma according to the present invention, comprising two catalytic supports and three dielectric substrates partly covered with electrodes.

FIG. 3 illustrates the cross-section view of a device for treating gases by means of a surface plasma according to the present invention. This device comprises three dielectric substrates (3) in the form of wafers, each of the wafers defining two opposite main surfaces.

The two opposite surfaces of each of these substrates each receive a first electrode (5) and a second electrode (6), the electrodes being each formed of a series of parallel strips, connected to a potential (electric power source) (4).

Catalytic supports (7) also appearing in the form of wafers are interposed between the substrates (3). The catalytic support (7) is arranged in front of the surfaces of the dielectric substrates having the surface plasmas generated around them.

Figure 4:
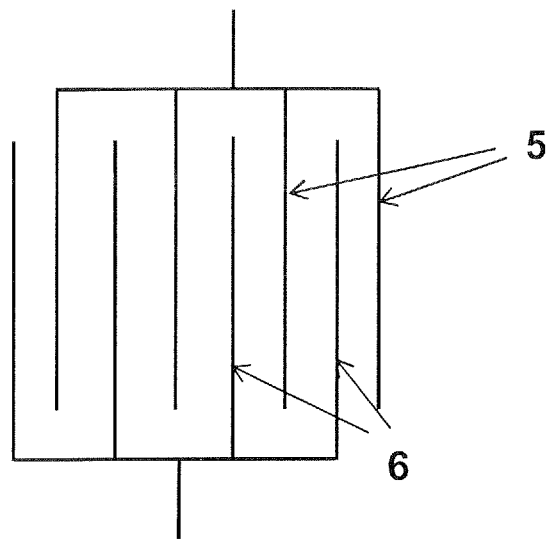
FIG. 4 illustrates the projection of the electrodes on a same plane parallel to the main plane of the substrate.

FIG. 4 illustrates the projection of the electrodes (5) and (6) of the substrate of FIG. 3 on a plane parallel to the substrate. Such a projection shows the interdigitation of the electrodes. The defining of an inter-electrode space (8) can thus be observed (FIG. 6).

Figure 5:
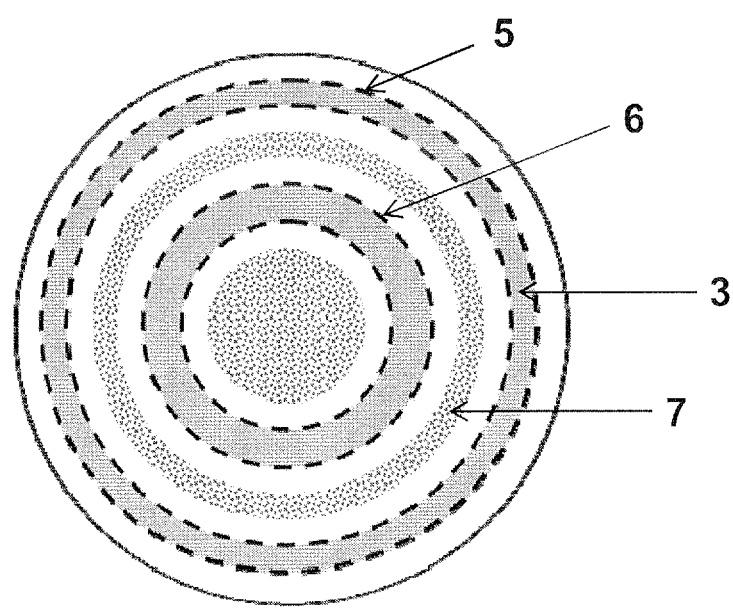
FIG. 5 illustrates a device for treating gases by means of a surface plasma according to the present invention of cylindrical geometry, comprising two dielectric substrates and two catalytic supports.

FIG. 5 illustrates a device for treating gases by means of a surface plasma according to the present invention having a cylindrical shape. The use of two coaxial cylindrical dielectric substrates, having a catalytic support interposed therebetween, cylindrical and coaxial with the substrates, can thus be observed. Further, a central catalytic support has been shown.

Figure 6:
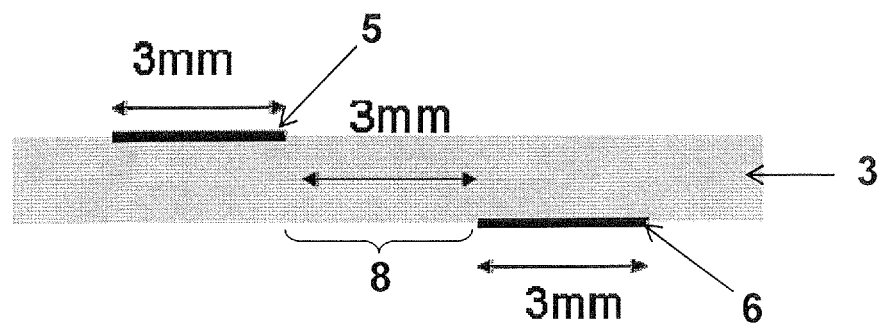
FIG. 6 illustrates the cross-section view of a device for treating gases by means of a surface plasma according to the present invention showing the inter-electrode space between the first and the second electrode deposited on a dielectric substrate.

FIG. 6 shows a longitudinal cross-section view of a dielectric substrate (3) comprising a first electrode (5) and a second electrode (6) interposed to form the inter-electrode space (8).

EXAMPLES

Examples 1 and 2 relate to the decomposition of toluene in dry air comprising 55 ppm of toluene.

Example 1

Prior Art

The rectangular reactor has a 4-cm height, a 12-cm width, and a 15-cm length. The gas inlet, connected to a gas injection device, in the present case dry air containing 55 ppm of toluene (the pollutant which is desired to be eliminated), is located at one end, and the gas outlet connected to a gas chromatography device to determine the toluene conversion rate, that is, its degradation rate, is located at the other end.

Two dielectric supports having a 12-cm width and a 14-cm length are arranged in the reactor. Shims having a 2-cm width, made of dielectric material (quartz), are arranged on either side along the reactor, to provide a 3-cm spacing between the two dielectric substrates. Electrodes cover the entire width of the dielectric substrate of the reactor (without the shim), that is, 8 cm, their length in the main axis of the reactor being approximately 7.5 cm.

The electrodes are made of copper and have a 3-mm width and a 7.5-cm length.

The inter-electrodes distance (8) in the configuration of FIG. 6 is 3 mm. Each surface of the dielectric substrates has seven electrodes. To provide the electric continuity, the electrodes are interconnected by a copper electrical circuit, along the width of the dielectric substrate. The first electrodes (5) are connected to the electric power supply of the generator, while the second electrodes (6) are grounded.

The device is swept by air containing 55 ppm of toluene until the area of the peak corresponding to toluene and measured by gas chromatography is stabilized to obtain a reference peak.

A sinusoidal voltage of +/−15 kV is then applied to the electrodes connected to the generator for a specific energy consumed by the plasma of 320 J/L.

The toluene conversion rate is determined after 30 minutes by measurement of the area of the corresponding peak by gas chromatography.

Then, the specific energy of the plasma is decreased and after 30 minutes, the new conversion rate is determined. The same procedure is applied for lower specific energies.

Figure 7:
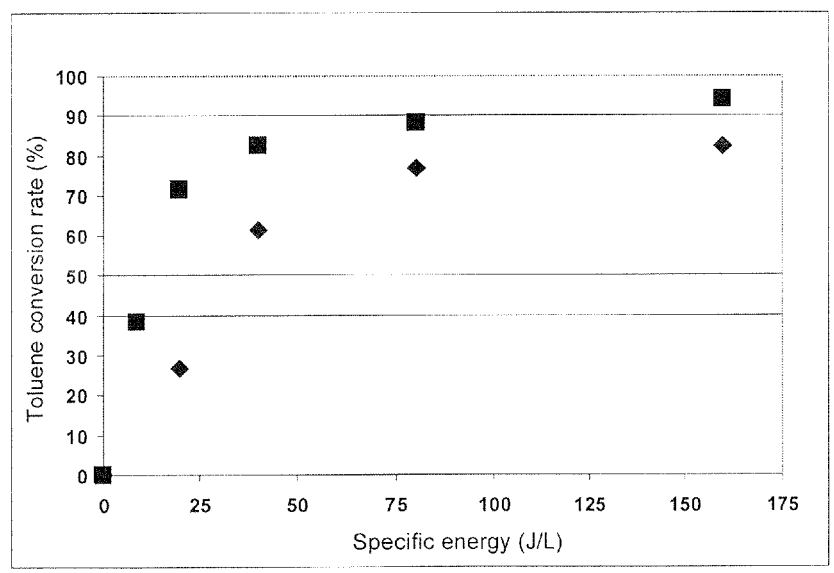
FIG. 7 shows the toluene conversion rate according to the specific energy applied to a device according to prior art (diamonds) and to a device according to the present invention (squares) in the context of the treatment of gases.

The obtained results are disclosed on the graph of FIG. 7 (diamonds), which shows the toluene conversion rates according to the specific energy consumed by the plasma. The "conversion rate" is related to the toluene degradation or decomposition rate. The toluene is converted into $CO_2$ and $H_2O$ by a large majority.

Example 2

Invention

The device is identical to that of example 1 but it further comprises a honeycomb catalytic support made of cordierite having a 5-mm thickness.

The catalytic support is arranged between the two dielectric substrates, 12.5 mm away from each of the dielectric substrates. It comprises approximately 500 ppm of platinum and 500 ppm of palladium in channels directed perpendicularly to the dielectric substrate wafers.

The experimental protocol is identical to that of example 1.

The results are also reproduced on the graph of FIG. 7 (squares). For an equivalent specific energy, the device according to the present invention (squares) has a higher conversion rate than that of prior art (diamonds). Accordingly, for an identical toluene conversion rate, the device according to the present invention requires less energy or has a higher conversion rate for an identical specific energy.

The invention claimed is:

1. A device for treating gases by means of a plurality of surface plasmas, comprising:
    at least one dielectric substrate having two opposite main surfaces, a plurality of first electrodes parallel to one another deposited on one of the two opposite main surfaces of said substrate, and a plurality of second electrodes parallel to one another deposited on the other main surface of the two opposite main surfaces of said substrate, the plurality of first electrodes and the plurality of second electrodes are arranged so that an interelectrode distance is in a range between 2 and 15 mm, said plurality of first and second electrodes being connected to two terminals of an electric power supply source, respectively so as to generate the plurality of surface plasmas, and at least one catalytic support, which is not in contact with the dielectric substrate and said plurality of first and second electrodes, and integrating a catalyst;

the at least one catalytic support being in front of a surface of the dielectric substrate having the plurality of surface plasmas generated thereon, wherein the plurality of first electrodes and the plurality of second electrodes cover from 10 to 90% of a total area of the two opposite main surfaces of the dielectric substrate, respectively, wherein the plurality of first electrodes have a same potential, and wherein the plurality of second electrodes have a same potential.

2. The device for treating gases by means of a plurality of surface plasmas of claim 1, wherein each of the plurality of first electrodes and each of the plurality of second electrodes have a width in a range between 1 mm and 10 cm, wherein the width extends in one of a direction substantially orthogonal to a flow direction of a gas to be treated and a direction substantially parallel to the flow direction of the gas to be treated.

3. The device for treating gases by means of a plurality of surface plasmas of claim 2, wherein each of the plurality of first electrodes and the plurality of second electrodes have a width in the range of 3 mm to 5 mm.

4. The device for treating gases by means of a plurality of surface plasmas of claim 1, wherein the catalytic support is a wafer of dense material selected from the group consisting of a metal and a ceramic foam.

5. The device for treating gases by means of a plurality of surface plasmas of claim 1, wherein the catalytic support is in the form of one of a metal honeycomb and a ceramic honeycomb.

6. The device for treating gases by means of a plurality of surface plasmas of claim 1, wherein the catalytic support has a thickness in a range between 1 mm and 10 cm.

7. The device for treating gases by means of a plurality of surface plasmas of claim 1, wherein the catalytic support comprises a catalyst selected from the group consisting of metal oxides, nitrides, metals, and mixtures thereof.

8. The device for treating gases by means of a plurality of surface plasmas of claim 7, wherein the metal, the metal oxide, and the nitride are based on a metal selected from the group consisting of Pt, Ag, Ru, Rh, Cu, Fe, Cr, Pd, Zn, Mn, Co, Ni, V, Mo, Au, Ir, and Ce.

9. The device for treating gases by means of a plurality of surface plasmas of claim 1, further comprising at least two dielectric substrates, and the at least one catalytic support is positioned between main surfaces of the at least two dielectric substrates including the plurality of first electrodes, or between main surfaces of the at least two dielectric substrates including the plurality of second electrodes.

10. The device for treating gases by means of a plurality of surface plasmas of claim 9, wherein a spacing between the at least two dielectric substrates is in a range between 10 mm and 15 cm.

11. The device for treating gases by means of a plurality of surface plasmas of claim 10, wherein the spacing between the at least two dielectric substrates is in a range between 1 and 5 cm.

12. The device for treating gases by means of a plurality of surface plasmas of claim 1, wherein the dielectric substrate and the catalytic support are spaced apart by 5 mm to 10 cm.

13. The device for treating gases by means of a plurality of surface plasmas of claim 1, wherein the inter-electrode distance is in a range between 4 mm and 8 mm.

* * * * *